United States Patent Office 3,558,678
Patented Jan. 26, 1971

3,558,678
PROCESS FOR PREPARING CARBOXYLIC ACID SOAPS FROM ALCOHOLS
Robert J. Fanning, Baton Rouge, La., assignor to Ethyl Corporation, New York, N.Y., a corporation of Virginia
No Drawing. Filed Oct. 11, 1968, Ser. No. 766,959
Int. Cl. C08h 17/36
U.S. Cl. 260—413                    8 Claims

ABSTRACT OF THE DISCLOSURE

The caustic fusion process for producing carboxylic acid soaps from alcohols is improved by employing a preliminary heat treatment of the reactants prior to the actual fusion reaction, the heat treatment or pretreatment being characterized by the performance thereof at a temperature or over a temperature range up to but usually somewhat below that at which a significant evolution of gas or vapor material from reactants, diluents or products is experienced at a pressure up to about 300–400 p.s.i.g. A principal result of performing the heat treatment is that when the main caustic fusion reaction to produce soaps is subsequently performed, forcefully liberating the normal copious quantities of by-product hydrogen at higher pressures than the 300–400 p.s.i.g., unreacted alcohols are not stripped out, reaction is faster, and higher yields of product soaps are obtained. Although this treatment is useful with individuals or combinations of alcohols of a wide range of molecular weights such as alcohols having from about 2 to about 30 carbon atoms per molecule, this process is particularly advantageous with the more volatile lower alcohols, particularly those having from about 6 to about 8 carbon atoms per molecule whose soaps and acids are highly desired for ester production.

BACKGROUND OF THE INVENTION

Field of the invention

The invention pertains to the preparation of straight chain and branched chain carboxylic acid soaps or salts of alkali metals and alkaline earth metals having from about 2 to about 60 carbon atoms per molecule, pure and in various combinations within the varieties and ranges set forth. In particular, the preferred soaps produced are saturated, of normal or straight-chain carbon skeleton configuration with minor amounts of branched soaps present; however, also included as less preferred soaps are branched-carbon skeleton soaps having typically lower alkyl groups such as methyl, ethyl, propyl, butyl, hexyl, octyl or decyl as side chains in various locations such as the 2, 3, 4, 5, 6, etc. positions on a significant proportion of the molecules; typically 20 percent. Included among those advantageously processed are mixtures wherein up to 100 percent of the molecules present are branched. The soaps produced are preferably saturated and free of internal functional groups such as keto or hydroxyl groups. In another method of expression the preferred soaps are straight-chain saturated monobasic carboxylic acid soaps which, except for the two oxygen atoms and the metal cation substitution in the single carboxyl groups, are composed solely of carbon and hydrogen. Preferred acids are those having a skeleton description as set forth above with hydrogen substituted for the metal cation. Utility for such soaps and acids is typically as substitutes for similar natural source derived materials in various large scale processes such as the preparation of high quality bar soaps and other soap products, the preparation of various types of esters for various purposes such as lubricants, hydraulic fluids, edible oils and fats and numerous applications as intermediates in the preparation of a wide variety of chemical compounds.

Description of the prior art

The preparation of carboxylic acid soaps and of carboxylic acids via the caustic fusion reaction of alcohols is a process that has been known for many years; however, it was only recently that this process became associated with the preparation of high purity soaps and acids of a type capable of effective direct substitution for naturally derived soaps and carboxylic acids in large use areas such as the manufacture of high quality soap products where cost is an important factor. One possible reason for this is that it was only recently that synthetic alcohols of high purity and low cost became available in quantities sufficient for consideration as raw materials for the production of soaps and acids. It must be observed that, until this stage of technology was reached, the usual derivation of alcohols was from the acid components of ester materials in natural source oils and fats such as coconut oil. Thus the normal prior large scale processing to produce natural type materials was to produce alcohols from acid structures, not vice versa, and this for the most part made natural source derived alcohols more costly than natural source soaps and acids so that there was no prior reason or basis for considering large scale production of natural source type soaps and acids from alcohols by a caustic fusion process or by any process for that matter. Those desiring acids have usually bought acids rather than more expensive alcohols.

The present invention is concerned particularly with the caustic fusion reaction of short chain or lower molecular weight alcohols under conditions of temperature and pressure such that a significant amount of the alcohols would ordinarily be vaporized from the reaction mass under the reaction conditions but for the involvement of the improvement of the present process. At first glance it would appear that such vaporization poses no particular problem since the vaporized alcohol seemingly could be collected and recycled; however, practical experience has shown that alcohols so vaporized experience a significant degree of dehydration or other alteration so that when the resulting materials are condensed and recycled to the reaction mass a significant proportion of the return material is not usable alcohol for the reaction but rather appears to be a partially dehydrated material including components such as olefins which are of no value for reaction with caustic to produce soaps. Surprisingly, little is known of this aspect of the caustic fusion reaction.

SUMMARY OF THE INVENTION

It has been discovered that the caustic fusion reaction of alcohols to produce carboxylic acid soaps is materially improved by performing a heat treatment (pretreatment) of the reactants prior to the actual reaction. The heat treatment is conducted under conditions, mainly a lower temperature than the principal reaction temperature, such that the evolution of significant quantities of vapor material from the reactor vessel is avoided during the heat treatment. It appears that a low-volatility intermediate, such as an alkali metal alkoxy compound, is formed which subsequently reacts readily under the usual conditions connected with the caustic fusion reaction with materially lessened tendency toward vaporization of materials present and at a higher mass reaction rate than the alcohols themselves directly without pretreatment.

DESCRIPTION OF THE PREFERRED EMBODIMENTS

A preferred embodiment of the present invention is in a process for producing carboxylic acid soaps by performing an overall reaction of alcohols $RCH_2OH$ with caustic $M(OH)_n$ at a reacting temperature from about 540° F. to about 630° F. in about a 1:1 molar ratio of alcohol to (—OH) groups in $M(OH)_n$. The soaps produced correspond to the carbon skeletal structure of the alcohols reacted, being of the formula $(RCOO)_nM$ wherein R is selected from normal alkyl and branched alkyl having from about 1 to about 29 carbon atoms per molecule. Alcohols used range from substantially pure individual alcohols to various mixtures of alcohols such as those available in various commercial mixtures. One such commercial mixture is the "lauryl" cut of natural coconut alcohol approximating 60–70 wt. percent dodecanol, 20–30 percent tetradecanol and 5–15 percent hexadecanol, typically 65/25/10.

Typical alcohols are ethanol, propanol, butanol, pentanol, hexanol, heptanol, octanol etc. ranging on up to $C_{30}$ inclusive, individually and in various combinations.

Other typical alcohols are 2-methyl propanol, 2-methyl butanol etc. up to about $C_{29}$ inclusive.

Other typical alcohols are 2-ethyl pentanol, 3-methyl hexanol, 3-methyl pentanol, 2-hexyl octanol, 2-ethyl hexanol, 3-methyl heptanol, 4-ethyl hexanol, 3-ethyl hexanol, 2,2-dimethyl propanol, 2,2-dimethyl butanol, 2,2-dimethyl pentanol, 2,2-dimethyl hexanol.

The foregoing alcohols are useful in compositions of various binary, ternary, quaternary, etc. combinations such as (wt. percent) about 50-50 percent octanol-decanol, 50-50 percent heptanol-octanol; 50-50 percent hexanol-octanol, 5-45-45-5 percent butanol-hexanol-octanol-decanol, 1/3-1/3-1/3 (molar) hexanol, octanol, decanol in an 80/20 mol ratio with 1/3-1/3-1/3 (molar) 2-ethyl butanol, 2-ethyl hexanol, and 2-ethyl octanol, and the like.

In the foregoing formula $(RCOO)_nM$, M (cation) is selected from the group consisting of alkali metal and alkaline earth metal elements. In greater particularity, the preferred group consists of lithium, sodium, potassium, magnesium, calcium and barium, individually and in various combinations such as substantially pure lithium; sodium, potassium, magnesium, calcium or barium and in various mixtures such as mixtures of sodium and potassium in approximately equal proportions (molar) or in proportions of approximately 75 percent sodium and 25 percent potassium or vice versa, or in mixtures of members of both groups of cation materials such as sodium and calcium in about equal proportions or in proportions of about 75 percent sodium and 25 percent calcium; or vice versa, and the like.

In the foregoing formula for the carboxylic acid soaps $(RCOO)_nM$, $n$ is a conventional valence factor for the metal M being 1 for those molecules wherein M is an alkali metal such as sodium, lithium, potassium and being two where M is an alkaline earth metal such as calcium, magnesium and barium.

Typical soaps that are produced in accordance with the teaching of the present invention are straight carbon chain saturated soaps such as sodium acetate, sodium propionate, sodium butyrate, sodium pentanoate, sodium hexanoate, sodium heptanoate, sodium octanoate, sodium nonanoate, sodium decanoate, sodium dodecanoate, sodium tetradecanoate, sodium hexadecanoate, sodium octa- decanoate, sodium eicosanate, sodium tetracosanate, sodium hexacosanate, sodium triacontanoate.

Other typical soaps are similar compounds of potassium such as potassium hexonate, potassium octanoate, potassium decanoate, potassium dodeconate and potassium triacontanoate.

Other typical soaps are similar compounds of lithium such as lithium hexanoate and lithium dodecanoate.

Other typical soaps are similar compounds of magnesium such as magnesium di-(heptanoate) and magnesium di-(tridecanoate).

Other typical soaps are similar compounds of calcium and barium such as calcium di-(heptanoate) and calcium di-(eicosanate) and barium di-(hexanoate).

Other typical soaps are branched chain soaps such as sodium 2-ethyl hexnaoate, potassium 2-ethyl octanoate, calcium di-(2-ethyl decanoate), magnesium di-(2-butyl decanoate).

A typical soap mixture exemplified for sodium soaps includes sodium hexanoate, sodium octanoate and sodium decanoate in about 45/45/10 respective weight proportions.

Another typical soap mixture includes sodium dodecanoate, sodium tridecanoate, sodium tetradecanoate and sodium pentadecanoate in about equal proportions as about 80 percent by weight of a mixture with about equal proportions of sodium 2-methyl undecanoate, sodium 2-methyl dodecanoate, sodium 2-methyl tridecanoate, sodium 2-methyl tetradecanoate.

Typical acids that are derived from the soaps by reaction with mineral acid correspond to the foregoing soaps such as dodecanoic acid corresponding to sodium dodecanoate, etc.

In the reaction of the foregoing alcohols and caustic to produce the corresponding carboxylic acid soaps, molecular hydrogen ($H_2$) is liberated at substantially the precise sites (same carbon atom of the structure) as the location of the hydroxyl groups in the starting alcohol molecules, the hydrogen being liberated in a ratio of 2 molecules thereof per molecule of starting alcohol $RCH_2OH$. In this instance it is important to observe that the caustic fusion reaction liberates hydrogen in the molecular form which is available as an off gas and which is a matter of direct and significant contrast to ordinary oxidation operations employing molecular oxygen or precursors and which liberate water ($H_2O$) rather than hydrogen. Because of this considerable difference in reaction mechanism and lack of parallels from one to the other, it tis emphasized that one should be careful to maintain a distinction between the caustic fusion process and the art relative thereto and arts pertaining to oxidation in general which usual employ some form of chemical agent that liberates atomic or molecular oxygen as such in situ and hence permit random attack on various carbon atoms of the starting alcohols. Chemical oxidizing agents or precursors to the extent a recitation of such may be useful include molecular oxygen, air, potassium permanganate, various peroxides, organic and inorganic, such as those of nickel, hydrogen, t-butyl hydroperoxide, cumene hydroperoxide and the like.

The liberation of hydrogen in the course of the caustic fusion reaction is a matter of a very definite and abrupt reaction threshold involving a fairly narrow transitional range of temperatures, for example, 5 to 20 degrees F. for various normal alcohols. It is noteworthy that such a narrow threshold transition range is experienced even with an actual temperature which is quite elevated being of the order of about 520 to about 550° F. In general, the threshold or transition is of such a sharp nature as to result in the virtual absence of liberation of hydrogen below the threshold whereas above the threshold the liberation of hydrogen is not an equilibrium proposition but continues even with the maintenance of autogenous pressures in excess of many thousands of pounds per square inch.

One important aspect of this forced liberation and release of hydrogen or of any other volatile material, even water, for that matter, is that the released material acts as a stripper gas to enhance removal of less volatile materials such as alcohols (and water) from the system. The result of this is that reactant alcohols leave the system to a greater or lesser extent if the caustic fusion reaction is performed under conditions wherein volatile alcohols are present during the liberation of hydrogen from the system.

Although alcohols thus removed can be condensed or otherwise collected and recycled to the same or a subsequent caustic fusion reaction in either batch or continuous systems, it is characteristic of the alcohols vaporized, collected and returned that a significant dehydration is experienced. Typical high quality starting alcohols R—$CH_2OH$ (where R is normal alkyl of 6–10 carbon atoms) have an iodine value of .09 cg./g. an OH value of 8.67 percent and a carbonyl value of 0.003 percent of the total oxygen of the alcohol tied up as carbonyl oxygen. In contrast to this, corresponding vaporized alcohols collected for recycle have a higher iodine value (more unsaturation) of from about 4 to about 10 cg./g. and a lowered hydroxyl value of from about 5 to about 7.5 percent. Together these figures represent a loss of hydroxyl groups of the returned alcohols by an amount ranging from several percent up to about 20 percent. Typically, it is not unusual with conventional prior art (no heat treatment) caustic fusion processing of alcohols having from about six to about eight carbon atoms to experience a vaporization overhead or "stripping" which is as high as 10 to 30 percent of the starting alcohols so that a loss of 10 to 20 percent thereof by dehydration represents a very significant loss of yield of product soaps.

The present invention seeks to reduce this loss materially by performing a newly discovered preliminary heat treatment of the reactants in a closed system below temperatures at which the evolution of hydrogen occurs to a significant extent. The effect of this heat treatment appears to be to convert the alcohols to a non-volatile species which is readily reactive under subsequent normal caustic fusion conditions releasing the 2 mols (per mol of starting alcohol) of hydrogen without removing significant quantities of alcohol from the system.

Although the actual caustic fusion reaction of alcohol or of intermediate is described in the foregoing as involving a fairly sharp temperature "threshold" proposition, the heat treating reaction is more of the nature of a time-temperature proposition which is accomplished at various rates for various temperatures which range from about ordinary room temperature up to a temperature just below that at which the fusion reaction begins as evidenced by a sharp increase in pressure for only a small change in temperature occasioned by the release of hydrogen. Thus, the pretreatment ranges from a temperature from about 60° F. up to a temperature of about 500° F., for essentially pure normal alcohols in which the R groups are straight chain with a terminal link to (—$CH_2OH$), or somewhat higher up to about 520° F. where the alcohols are substantially all branched alcohols; that is, where the linkage of R to the (—$CH_2OH$) group is via a tertiary carbon atom of R (vinylidene structure) or via a secondary carbon atom of R (remotely branched primary structure). In general, in the more frequently encountered mixtures which are rich in primary alcohol ($RCH_2OH$) and which contain only small quantities of branched alcohols such as those having from about 5 to about 20 mole percent branched alcohols, one generally seeks to perform the heat treatment reaction somewhat below about 500° F. providing a preferred range from about 150° F. to about 500° F., with upper ranges above about 300° F. frequently preferred from a time-effectiveness basis.

The time aspect of the heat treatment involves either a short time basis of the order of 10 to 15 minutes for the elevated temperatures of the order of 480–500° F. or a longer term basis such as up to 24 or even 48 hours when using the lower temperatures such as those of the order of 60 to 120° F. An alternate convenient time-temperature combination corresponds to a temperature based on low pressure process steam such as a temperature of the order of 250–300° F. Preferred time durations for treatment from about 150° F. to about 520° F. are from about 120 minutes to about 5 minutes. A treatment time of five to one hours is typical under 250–300° F. conditions, a typical time for 300° F. being 60 minutes.

The significance of the various time-temperature relationships recited herein involves in many instances consideration of using low cost auxiliary vessels. On the other hand, one may prefer to use the high temperature-short contact times in batch type operations when the heat treatment is performed in the same reactor in which the caustic fusion reaction is subsequently performed. In such service, it is usually desired to avoid tying up the high pressure reactor (400 lb. working pressure rated) for prolonged heat treatment periods so that the higher temperatures are preferred. Operation associated with the room temperature and process steam conditions ranging from about 60 to about 300° F. usually represents either batch or continuous operation of the caustic fusion reaction in one high pressure reaction vessel, with a separate vessel of lower pressure rating being used for the heat treatment which is performed as either a batch or a continuous operation at pressures ranging from about atmospheric up to about 100 p.s.i.g., or in some instances from about 0 to about 25 p.s.i.g.

Pressures involved in the heat treatment process operation are generally low in comparison to fusion reaction pressures and depend largely upon the partial pressure of water such as that introduced with the caustic reactant and upon the partial pressure of the alcohol reactants, particularly the lower molecular weight constituency of such. In many instances, the presence of various volatile organic impurities of a diluent nature such as residual olefins and the like may provide a significant portion of the vapor pressure involved in the heat treatment system. The pressures typically involved in heat treatment are autogenous ranging from about atmospheric pressure at the lower temperatures of about room temperature up to pressures of the order of 100 p.s.i.g. for the higher ranges of heat treatment temperatures specified, particularly where there is considerable water co-present as, for example, where the caustic is introduced in a low cost 50 wt. percent aqueous solution. Pressures are generally lower where the caustic is introduced in a typical moderate cost 85 wt. percent, 15 percent water, form.

A fundamental consideration for a most effective heat treatment with minimum loss of volatile alcohols is that the heat treatment system be closed, that is, that it operae under autogenous or moderate super-pressure without release of either hydrogen or other gas or vapor material that may carry with it some of the volatile alcohols. In less preferred embodiments, limited partial condensing systems, particularly in conjunction with embodiments which use the lower temperatures ranging from room temperature up to about 300° F., which are below dehydration temperature, make it possible to perform the heat treatment with simultaneous removal of part of the water accompanying the caustic. Such water removal is desirable in some instances as a procedure or means for minimizing the volume of water that must be handled as liquid and as vapor in the caustic fusion reaction system, particularly where dilute caustic solutions, such as 50 percent by weight caustic are employed to introduce the caustic. In appropriate instances it is possible to remove during the heat treatment phase virtually all of the solvent or diluent water that may have been introduced with the reactant; however, one normally retains at least about one mole of water per mole of alcohol reacting, overall, to insure adequate water for the conversion of the "alkoxide intermediate" to the soap form in the caustic fusion reaction and to provide improved viscosity to facilitate a fluid phase transfer through piping between the heat treatment system and the caustic fusion reaction system, particularly where separate reactors are employed for the heat treatment and the caustic fusion reaction.

One important aspect of the heat treatment reaction and of the alcohols treated in general is that the alcohols are for the most part comparatively immune to "methylene-group oxidation attack" (random oxidation by molecular oxygen) below temperatures of about 210–220° F. The "non-volatile intermediate" form obtained in the heat treatment step of the present process is a different proposition; however, since experience has shown it to be subject to significant deterioration in the presence of free molecular oxygen even at room temperatures. Thus, for maximum quality of products it is desired to provide for the exclusion of oxygen from the heat treatment system as well as for the removal of residual quantities of oxygen in dissolved or other form from the reactants themselves.

Thus, it is desired that the heat treatment in the most preferred embodiments be performed in such a way as to remove residual quantities of oxygen and free oxygen-providing materials from the reactants prior to a time at which a significant proportion of the heat treatment reaction can occur. In some embodiments, this preliminary removal of oxygen is accomplished by sweeping the system with nitrogen or by subjecting the alcohol and caustic reactants to vacuum treatment to remove part or all of co-present oxygen. Such a treatment is particularly effective, for example, where the caustic is employed in the form of a 50 percent by weight aqueous solution which has been handled or stored under such conditions as to permit the absorption therein of significant quantities of oxygen.

On the other hand, in general, one ordinarily finds that caustic solutions derived through various evaporation concentration techniques as well as alcohols produced under oxygen-free conditions and stored under nitrogen will contain such minute quantities of associated free oxygen or oxygen sources as to make it unnecessary to make special provision for the removal of oxygen from the reactants, it being sufficient with such materials when freshly prepared merely to provide for the exclusion of oxygen after the beginning of the heat treatment reaction.

The exact nature of the non-volatile intermediate material formed during the heat treatment reaction is not known with any degree of certainty. As fas as titration is concerned, the material reacts for the most part like corresponding soaps suggesting that the material formed is an alkoxide of the metal of the caustic, typically $RCH_2ONa$ where the caustic material is sodium hydroxide. One aspect of considering the material to be such an alkoxide, however, is that the alkoxide seemingly requires the co-presence of one molecule of water for the subsequent completion of the caustic fusion reaction to the soap leading to the general consideration that one should exercise caution to avoid removing all water from either the heat treatment system or from the caustic fusion reaction environment itself when using heat treated raw materials otherwise yield losses may be experienced due to inadequate amount of water present in the latter stages of operation.

When heat treated reactants are subjected to the caustic fusion reaction temperature conditions, hydrogen is released at substantially the stoichiometric ratio of two moles of hydrogen per mole of alcohols $RCH_2OH$ fed to the heat treatment step. The significance of this is the consideration that if lesser quantities of hydrogen are released in the caustic fusion step, such may be an indication of inadequate water or that there was a significant amount of caustic fusion reaction in the heat treatment process. The latter in general is undesired, though usually acceptable to some extent, because of the stripping of alcohols by the hydrogen that cannot be suppressed if the caustic fusion threshold is exceeded in the pretreatment.

An incidental but valuable benefit of performing the heat treatment described herein is the favorable effect that such treatment has upon rate of reaction in the caustic fusion reactor which in many cases is represented by a significant reduction in the required cycle time in batch reaction systems. Experience has shown that the non-volatile intermediate formed in the heat treatment reaction liberates hydrogen at a much higher rate than equivalent untreated reactants fed to the caustic fusion reactor, once the caustic fusion reaction temperature threshold is exceeded. Such enhanced caustic fusion reaction rates make the heat treatment a valuable adjunct to the reaction of the higher alcohols such as those having from about 12 to 16 and more carbon atoms per molecule where volatility problems are generally minor.

Example I 1724 grams of dry NaOH, 304 grams of water and 5000 grams of alcohols were added to an electrically heated, well agitated 5-gallon autoclave provided with a relief valve preset to 350 p.s.i.g. The water used provided an 85 wt. percent aqueous caustic system plus the alcohol. The alcohol used was equal weights of synthetic hexanol-1 and octanol-1 produced via ethylene chain growth on triethyl aluminum to corresponding $C_6$ and $C_8$ trialkyl aluminum compounds, oxidation of the trialkyl aluminum compounds to trialkoxy aluminum compounds and hydrolysis to alcohols using Ziegler technology as represented by U.S. Pat. 2,892,858. The mole ratio of caustic to alcohol is 1:1 stoichiometric for the overall reaction:

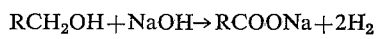

$$RCH_2OH + NaOH \rightarrow RCOONa + 2H_2$$

The autoclave was closed, swept with nitrogen, pressurized to 10 p.s.i.g., heated to 450° F. and held at that temperature for 60 minutes. Pressure was autogenous rising to about 70 p.s.i.g. at the conclusion of the 60 minutes treatment.

At the conclusion of the heat treatment period the temperature of the autoclave was raised to 530–540° F. in a 20 minute period and was maintained at that temperature for 180 minutes. The pressure of the autoclave rose rapidly at about 500° F., reaching the preset pressure of 350 p.s.i.g. at a temperature of 510° F.

After the 180 minute constant temperature operation, the temperature was raised gradually during an additional period of about 100 minutes duration reaching a concluding temperature of 650° F. after a total time of 285 minutes of fusion reaction.

Soaps were obtained corresponding to the alcohols. A portion of the soaps was converted to acid by reaction with 30 percent aqueous $H_2SO_4$. The acid phase was separated from the aqueous phase by decantation.

Example II

A pretreatment was performed as in Example I; however the alcohols used were a mixture of 65 wt. percent dodecanol-1, 25 wt. percent tetradecanol-1 and 10 wt. percent hexadecanol-1 which had an average molecular wt. of 197.

The mixture was stirred initially and the agitation stopped allowing the mass to remain in a dormant state for approximately 65 hours at room temperature. The system was then heated to caustic fusion temperatures of 560–580° F. providing a higher reaction rate as evidenced by rapid gas evolution and short reaction time in comparison to similar reactions without the pretreatment.

Example III

Prior experiments are repeated for heat treatment durations times ranging from about 120 minutes to about 5 minutes at temperatures from about 400 to about 510° F. Similar desirable results are obtained.

Example IV

Prior experiments are repeated at about 505° F. with a contact time of about 5 minutes. Similar desirable results are obtained.

Example V

Prior experiments are repeated at about 450° F. with a contact time of about 60 minutes. Similar good results are obtained.

Example VI

Example I is repeated using a six-gallon nickel-lined well-agitated reactor heated by Dowtherm and equipped with a vapor release valve preset to 400 p.s.i.g. A charge of 11.6 lbs. of alcohol containing equal weight proportions of synthetic hexanol-1 and octanol-1 as in Example I is added to the reactor and the reactor is heated to a temperature of about 300° F. An 85 wt. percent caustic solution at 475° F. containing four pounds of NaOH and 0.7 pounds of water is added to the reactor system.

For the pretreat step, the system is heated to about 375° F., held at this temperature for about 10 minutes and thereafter during about 20-35 minutes, the temperature is increased substantially linearly with time up to about 520° F. During this pretreat step, the pressure in the system increases from about 50 p.s.i.g. at 375° F. to about 310 p.s.i.g. at 520° F. This maximum is below the set presure of 400 p.s.i.g. therefore the system remains substantially closed-in during this step.

The fusion reaction of alcohol and caustic begins significantly when the temperature is increased further to about 530° F. The fusion reaction is conducted for about 119 minutes following a time-temperature profile similar to that of Example I wherein about 530-540° F. is maintained for approximately 60 minutes following which the temperature is raised gradually during the remaining 59 minutes to reach a final temperature of 650° F. at which time the run is concluded. In this reaction time, 7.9 standard cubic feet of hydrogen of 99.99 percent purity (dry basis) is released. The reaction yields 14.4 pounds of soap which on purification and acidulation reaction with aqueous sulphuric acid and decantation separation yields 12.4 pounds of mixed fatty acids having six and eight carbon atoms per molecule.

Example VII

Example I is repeated in a series of run with LiOH, KOH, Mg(OH)$_2$, Ca(OH)$_2$ and Ba(OH)$_2$ substituted for NaOH to produce corresponding soaps of lithium, potassium, magnesium, calcium and barium. The use of water initially is optional with poorly soluble hydroxides; however, sufficient water is retained for conversion of "alkoxide and intermediates" to soaps.

Example VIII

Prior examples are repeated with various saturated alcohols and mixtures RCH$_2$OH having from 2-30 carbon atoms per molecule, of various straight and branched chain percentages and various branched chain configurations. The R groups of the alcohols are composed solely of carbon and hydrogen.

Typical pretreatment temperatures and periods for the alcohols are as follows.

| Temp., ° F. | Time |
|---|---|
| 60 | 48 hours. |
| 120 | 24 hours. |
| 150 | 16 hours. |
| 250 | 300 minutes. |
| 300 | 60 minutes. |
| 480 | 15 minutes. |
| 500 | 10 minutes. |
| 520 | 5 minutes. |

The pretreated materials are then reacted to carboxylic acid soaps as in previous examples. A part of the soaps thus obtained is reacted with aqueous (30 percent wt.) H$_2$SO$_4$ to liberate the organic acids which are separated from the resulting aqueous phase by decantation.

Group I-A alkali metal M components of the soaps are lithium (AW=7), sodium (AW=23) and potassium (AW=39).

Group II-A alkaline earth metal M components of the soaps are magnesium (AW=24), calcium (AW=40) and barium (AW=137). The grouping is that of the Fisher Scientific Company 1955.

What is claimed is:

1. In a process for reacting alcohol RCH$_2$OH with caustic M(OH)$_n$ at a temperature from about 530° F. to about 650° F. in about a 1:1 molar ratio of alcohol molecules to OH groups in M(OH)$_n$ to produce corresponding carboxylic acid soaps of the formula

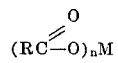

$$(R\overset{O}{\overset{\|}{C}}-O)_nM$$

wherein:
R is selected from normal alkyl and branched alkyl of from about 1 to about 9 carbon atoms and composed solely of carbon and hydrogen,
M is selected from the group consisting of lithium, sodium, potassium, magnesium, calcium and barium,
$n$ is a valence factor for M, being 1 where M is selected from lithium, sodium and potassium and 2 where M is selected from magnesium, calcium and barium,
liberating hydrogen (H$_2$), the improvement wherein:
the alcohol and caustic are pretreated together in a closed system at a temperature from about 250° F. to about 520° F. and below a temperature at which significant release of hydrogen from the reaction system occurs, for a time duration from about 300 minutes to about 5 minutes, and in the absence of free oxygen,
and then the pretreatment product is subjected to the foregoing reacting temperature conditions wherein hydrogen is released at substantially the stoichiometric ratio of 2 mols of hydrogen per mol of alcohol RCH$_2$OH.

2. The process of claim 1 wherein:
R is predominantly normal alkyl having from about 2 to about 8 carbon atoms per molecule, M is lithium, sodium or potassium, and
the pretreatment temperature is from about 300° F. to about 500° F. for a time duration of from about 60 minutes to about 10 minutes.

3. The process of claim 1 wherein:
R is predominantly normal alkyl having from about 2 to about 8 carbon atoms per molecule, M is lithium, sodium or potassium, and
the pretreatment temperature is from about 480° F. to about 500° F. for a time duration of from about 15 minutes to about 10 minutes.

4. The process of claim 1 wherein:
R is predominantly normal alkyl having from about 2 to about 8 carbon atoms per molecule, M is lithium, sodium or potassium, and
the pretreatment temperature is from about 250° F. to about 300° F. for a time duration of from about 300 minutes to about 60 minutes.

5. The process of claim 1 wherein.
R is predominantly normal alkyl having from about 2 to about 8 carbon atoms per molecule, M is lithium, sodium or potassium, and
the pretreatment step temperature is at about 375° F.

for an initial period of about ten minutes duration which is followed by a second period wherein the temperature is increased substantially linearly with the time during about 20–35 minutes to about 520° F.

6. The process of claim 1 wherein the caustic is NaOH.

7. The process of claim 1 wherein said alcohol consists essentially of a mixture of hexanol-1 and octanol-1 and the caustic is NaOH.

8. The process of claim 1 wherein said alcohol consists essentially of a mixture of octanol-1 and decanol-1 and the caustic is NaOH.

References Cited

UNITED STATES PATENTS

| | | | |
|---|---|---|---|
| 2,159,700 | 5/1939 | Henning | 260—413 |
| 2,293,649 | 8/1942 | Howk | 260—413 |

LEWIS GOTTS, Primary Examiner

E. G. LOVE, Assistant Examiner

U.S. Cl. X.R.

260—531